United States Patent [19]

Miller

[11] 4,093,364
[45] June 6, 1978

[54] DUAL PATH PHOTOGRAPHIC CAMERA FOR USE IN MOTOR VEHICLES

[76] Inventor: Keith G. Miller, 88 Carroll St., Binghamton, N.Y. 13902

[21] Appl. No.: 765,841

[22] Filed: Feb. 4, 1977

[51] Int. Cl.² ............................................. G03B 29/00
[52] U.S. Cl. .................................. 352/132; 352/243; 354/81; 354/293
[58] Field of Search .................. 352/132, 243; 354/81, 354/293; 248/11, 183

[56] References Cited

U.S. PATENT DOCUMENTS

| | | | |
|---|---|---|---|
| 2,907,253 | 10/1959 | McDonald | 354/293 |
| 3,032,766 | 5/1962 | Weaver | 354/293 |

Primary Examiner—Monroe H. Hayes
Attorney, Agent, or Firm—Frederick E. Bartholy

[57] ABSTRACT

A photographic recording arrangement to be mounted in a motor vehicle, particularly for use by law enforcement personnel, is described. The arrangement includes a camera of specific construction which is mounted on the dashboard and is capable of automatically taking, on a reel of film, sequential frames of pictures of the vehicle under observation, thus recording the license plate thereof, as well as the behavior of the driver handling the vehicle and, in another sequence, photographically recording, in a given number of frames, the speedometer reading of the car in which the camera is mounted.

4 Claims, 5 Drawing Figures

DUAL PATH PHOTOGRAPHIC CAMERA FOR USE IN MOTOR VEHICLES

This invention relates to a recording arrangement for motor vehicles used by law enforcement personnel, particularly for photographic recording of vehicles being followed or pursued.

At the present time, fast and automatic recording of the speed of a vehicle is obtained by radar installations. While such readings are generally accurate, they give no information regarding the vehicle, per se, nor the behavior of the driver in handling such vehicle. The latter is an important factor in establishing the competency of the driver to handle such vehicle.

Moreover, testimony of an arresting officer as to the operator's behavior in driving the vehicle, is merely a verbal statement, the accuracy of which cannot be proven; whereas, a photographic recording of the movement of the car, especially combined with a photographic recording of the speed required in the pursuit of a car, furnishes incontestable proof of the situation resulting in the apprehension of the driver.

In the prior art photographic recording has been shown where a camera, mounted in a vehicle in various ways, has the object of making photographic recordings of a car being followed or pursued.

In this connection, attention is directed to U.S. Pat. No. 2,148,119 which discloses a camera mounted on the sun visor inside the car so that its angle may be adjusted. In addition, a special speedometer is mounted outside of the car within the viewing angle of the camera so that the photographic recording will include, in addition to the view of the car travelling ahead of the following vehicle, the speedometer reading of the pursuing car.

U.S. Pat. No. 3,176,602 disclosing a camera mounted on the dashboard of the car for recording events occuring ahead of the vehicle, is also of interest.

It is the primary object of this invention to obtain a photographic record of a vehicle travelling ahead of the one following it, or in pursuit thereof, utilizing a camera mounted in the pursuing vehicle.

It is a particular feature of the invention that the camera is of special construction, permitting sequential frame exposures of a roll of film therein, alternately and automatically taking discrete frames of pictures of the vehicle being followed and also of the speedometer mounted on the dashboard of the pursuit car.

It is a particular advantage of the invention that the camera utilized is mounted on the dashboard in such a manner that it may be lowered, thereby concealing it when not in use.

Other objects, features, and advantages will be apparent from the following detailed description of the invention, pointed out in particularity in the appended claims and taken in connection with the accompanying drawing, in which:

Figure 1:
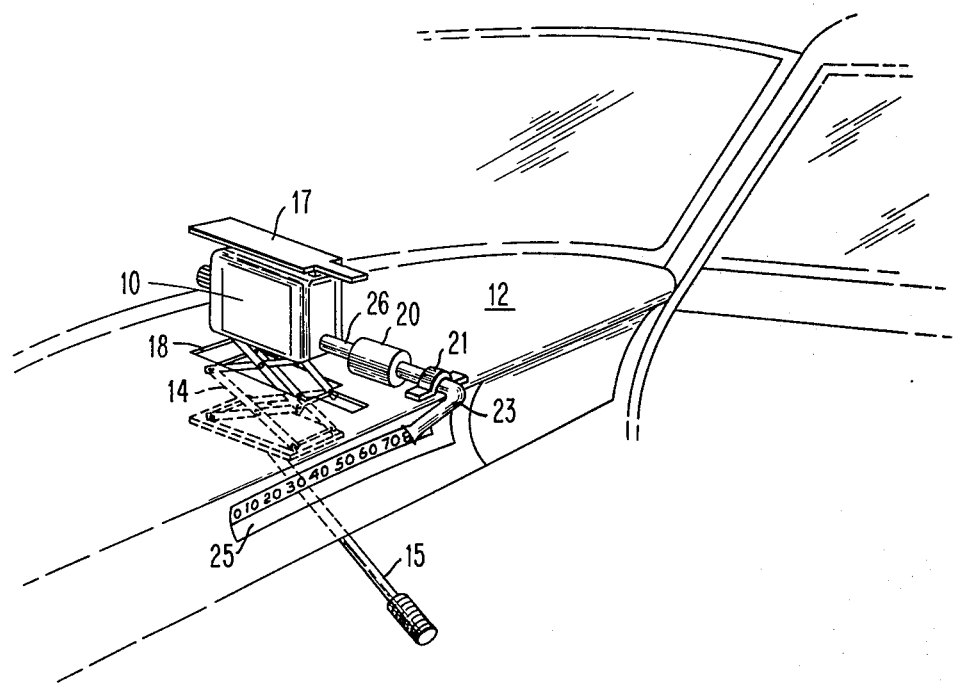
FIG. 1 is a perspective view of the camera erected above the dashboard of the car with a multiple-reflection, tubular-extension, image-gathering element, facing the speedometer.

Referring to the figures, in FIG. 1 it is seen that the camera 10 extends from the dashboard 12 by means of an erecting device 14 consisting of a lazy tongs assembly which may be actuated by means of a lever 15 extending below the dashboard 12.

It is to be noted that the camera 10 has a portion 17 attached thereto of such configuration as to match the cutout 18 needed in the dashboard 12 in order to permit lowering of the camera 10 into the space provided below the dashboard 12.

It is to be observed that the camera 10, in its erected position, cooperates with a coupling member 20 mounted in the dashboard 12, by means of a strap 21. The coupling member 20 has a tubular extension 23 which is adjustable to face the speedometer 25 of the car.

Figure 2:
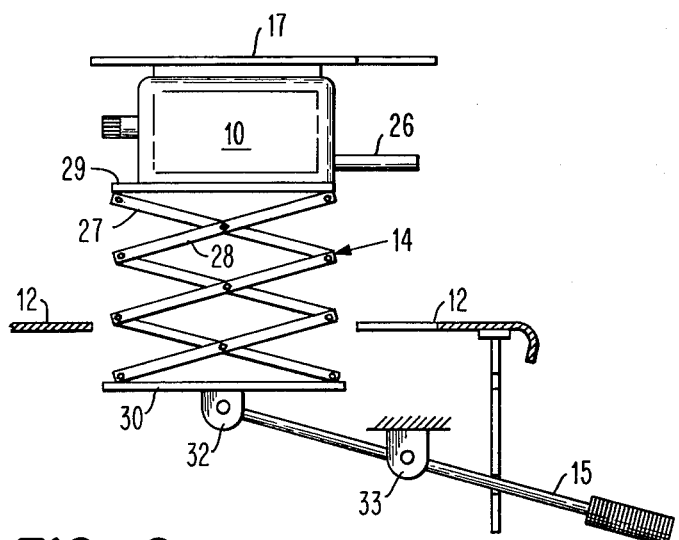
FIG. 2 is a schematic side elevational view of the camera and mounting assembly, illustrating the raising and lowering mechanism.
Figure 3:
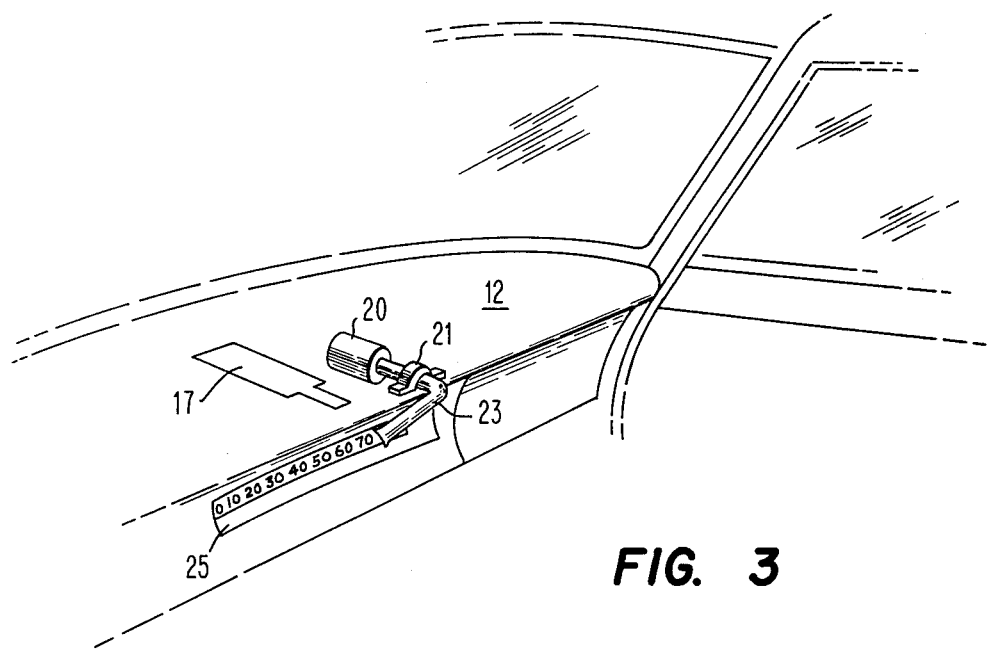
FIG. 3 is a view of the dashboard of the car with the camera lowered and hidden from view.

In FIG. 2 the actuation of erecting and lowering the camera 10 is schematically shown, consisting of the erecting device 14 in the form of a lazy tongs type leverage having cross linking arms such as 27 and 28 attached to an upper platform 29 to which the camera 10 may be affixed in any desired manner and a lower platform 30 to which the lever arm 15 is pivotally attached at the bracket 32 as well as at supporting bracket 33 which is secured at a convenient location to the frame of the dashboard 12. The purpose of this arrangement is simply to raise the camera 10 into operating position above the dashboard or to lower it into inoperative position below the dashboard 12. In the latter position, as seen in FIG. 3 the cover portion 17 completes the surface configuration of the cutout 18 in dashboard 12 so that the camera 10 is completely hidden when not in use. The material for the cover portion 17 would of course be the same type as that which covers the dashboard 12.

Figure 4:
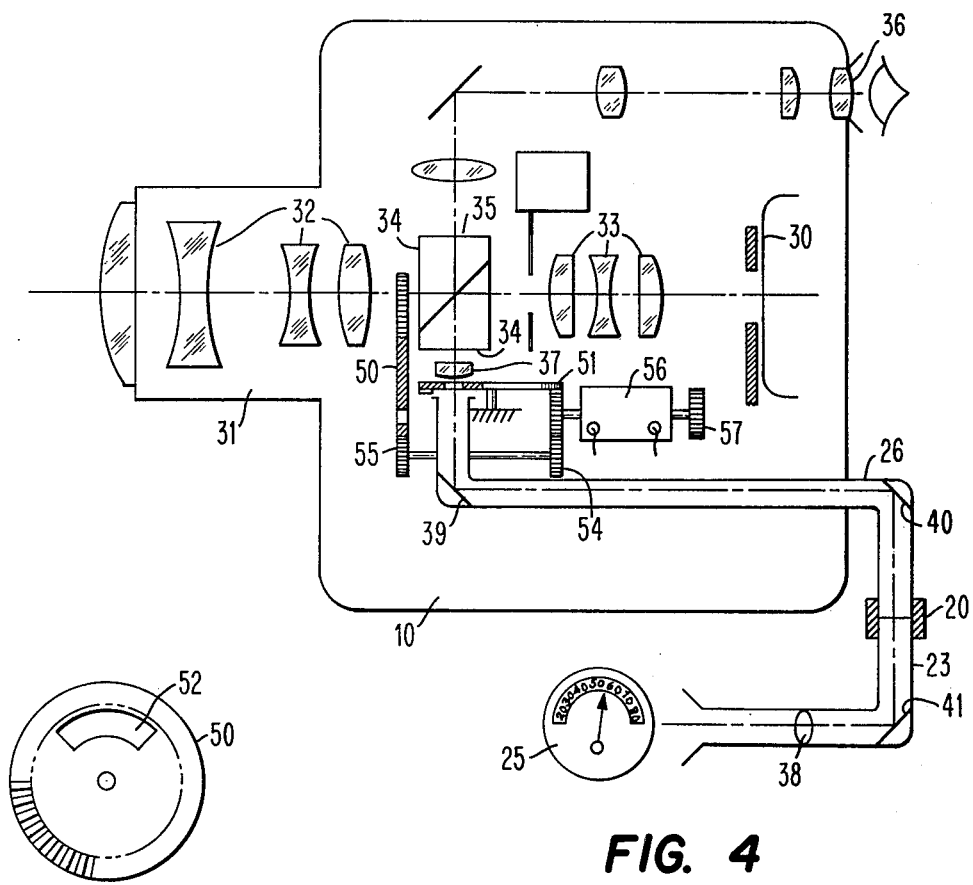
FIG. 4 is a sectional schematic view of the camera showing only the essential elements for the understanding of its operation.

FIG. 4 is a schematic cross sectional view of the specific camera, in accordance with the invention, intended to be used for photographic recordings of a vehicle being followed by another.

In this figure only the essential elements of the camera are shown in schematic form sufficient for the understanding of its operation. For example, it is to be understood that, in the image plane 30, film is moved by conventional means from a supply roll to a take-up roll. For the sake of simplifying the illustration, this has been omitted. It is well understood that cameras of the motion picture type have such film feed in various forms.

The essential features of the camera include the lens 31 which has a frontal lens element 32 and a rear element 33. Between these elements which together form an adjustable focal length objective is placed a light splitting prism 34 which has several functions, one being to reflect from its upper face 35 an image formed by lens 31 onto a view finder 36. At the opposite end of the light exit face 35 of the prism 34 is placed an image forming lens 37 which focuses light entering from a multiple reflection secondary light input comprising the tubular members 23 and 26 collapsibly joined in the sleeve 20 and the lens 38. This assembly has mirrors 39, 40 and 41 so placed as to reflect an image from lenses 38 and 37 in order to be fed into the lower face of the prism 34.

By the above arrangement, a dual input is provided for the camera, one from the objective lens 31 ahead of the camera, and the other from the objective lens 38 in a reflecting light path away from the camera.

Figure 5:
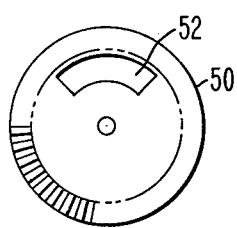
FIG. 5 is a view of one of the segmental shutter discs for the sequential exposure from the dual paths of the light input of the camera.

In order to sequentially receive light inputs from these two sources, a revolving shutter is provided which comprises two sector discs of the configuration shown in FIG. 5. The disc 50 interrupts the light path from the frontal objective lens 31, and the disc 51, rotating in a horizontal plane, interrupts the light path from the remote location. The discs 50 and 51 have cutout sectors such as 52 so dimensioned as to alternately close and open their respective light paths. The above blades are interconnected by suitable gear couplings 54 and 55 with a drive motor 56. The gear 57 of the latter may also be used to drive the film transport mechanism, not shown here.

The discs 50 and 51 are so displaced that, when one has the open sector to permit light to enter, the other has the opaque portion preventing an image from being formed on the surface of the prism 34. The open sectors of the blades 50 and 51 may be of different proportions whereby, from one light input, more picture frames are taken than from the other. In practice, a longer exposure time would be allowed from the frontal objective 31 which is focused on the subject ahead of the pursuing vehicle in order to give a sufficient number of image frames to record the behavior and movement of the car; whereas, from the secondary light input, namely, the reflecting arrangement, which forms an image of the speedometer 25 of the car, only few frames would be necessary.

A power source and a switch to actuate the motor 56 is not shown here inasmuch as any standard connection from the battery of the car would be suitable with an actuating switch placed at any handy location for the operator of the vehicle.

The invention in its broader aspects is not limited to the specific embodiments herein shown and described but changes may be made within the scope of the accompanying claims without departing from the principles of the invention and without sacrificing its chief advantages.

What is claimed is:

1. A photographic recording arrangment for vehicles, including a camera extendably mounted on the dashboard thereof and faced in the direction of travel of said vehicle, said camera having a frontal lens element and a rear lens element for focusing an image of the subject in front of the camera onto the image plane thereof, and a light-splitting prism between said lenses for focusing an object from a secondary path onto said rear element, said secondary path including an image gathering element comprising a tubular extension of light reflecting mirrors and a lens, said extension being adjustable for facing the speedometer of said vehicle and thus directing an image thereof onto said prism and thereby through said rear lens element onto the light-sensitive film in the image plane of said camera.

2. The arrangement in accordance with claim 1 wherein said camera is so mounted on the dashboard of the car as to be lowered into the cavity thereof in order to be invisible when not in use.

3. The arrangement in accordance with claim 1 wherein the top of said camera has affixed thereto a portion of the material similar to that of said dashboard and having the configuration of the cutout thereof whereby, upon lowering the camera, said portion fits into said cutout, thus presenting a continuous surface of said dashboard.

4. The arrangement in accordance with claim 1 wherein the extensible mounting of the camera comprises a lazy tongs type assembly having an actuating arm extending below said dashboard for raising and lowering said camera by the user thereof.

* * * * *